United States Patent
Wakabayashi et al.

(10) Patent No.: US 7,112,381 B2
(45) Date of Patent: Sep. 26, 2006

(54) VEHICLE FUEL CELL POWER PLANT WARM-UP CONTROL

(75) Inventors: Keisuke Wakabayashi, Yokosuka (JP); Yasukazu Iwasaki, Yokohama (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 516 days.

(21) Appl. No.: 10/399,261

(22) PCT Filed: Nov. 12, 2002

(86) PCT No.: PCT/JP02/11766

§ 371 (c)(1),
(2), (4) Date: Apr. 16, 2003

(87) PCT Pub. No.: WO03/052855

PCT Pub. Date: Jun. 26, 2003

(65) Prior Publication Data

US 2004/0142216 A1 Jul. 22, 2004

(30) Foreign Application Priority Data

Dec. 19, 2001 (JP) .............................. 2001-385713

(51) Int. Cl.
*H01M 8/12* (2006.01)
*B60Q 1/00* (2006.01)

(52) U.S. Cl. ........................... 429/22; 429/26; 429/24; 340/438; 701/22

(58) Field of Classification Search ................ 429/26, 429/24, 22, 20, 13, 23; 361/21, 24, 30, 93.8; 700/286; 701/22; 180/65.3, 165; 340/438
See application file for complete search history.

(56) References Cited

U.S. PATENT DOCUMENTS 5,939,794 A * 8/1999 Sakai et al. ................ 290/40 A
5,964,309 A   10/1999 Kimura et al.

FOREIGN PATENT DOCUMENTS

| EP | 1 091 437 A | 4/2001 |
|----|-------------|--------|
| JP | 4-262370 | 9/1992 |
| JP | 04-262370 | 9/1992 |
| JP | 08-126116 | 5/1996 |
| JP | 09-098515 | 4/1997 |
| JP | 2000-173638 | 6/2000 |
| JP | 2001-143735 | 5/2001 |
| WO | WO/ 0134424 A1 | 5/2001 |

* cited by examiner

*Primary Examiner*—Raymond Alejandro
(74) *Attorney, Agent, or Firm*—McDermott Will & Emery LLP

(57) ABSTRACT

A fuel cell power plant comprises plural fuel cell stacks (10A–10B) capable of generating power independently, and a warm-up circuit (33) which can independently warm up the fuel cell stacks (10A–10C). A controller (14) estimates a required output power of the power plant within a predetermined time from when the vehicle starts running (S121–S127), and determines the number of fuel cell stacks satisfying the required output power (S106). The controller (14) economizes energy required for warm-up of the fuel cell stacks while providing the required output power by warming up only the determined number of fuel cell stacks before the vehicle starts running.

12 Claims, 9 Drawing Sheets

VEHICLE FUEL CELL POWER PLANT WARM-UP CONTROL

FIELD OF THE INVENTION

This invention relates to warm-up control of a fuel cell power plant for vehicles provided with two or more fuel cell stacks.

BACKGROUND OF THE INVENTION

Tokkai 2000-173638 published by the Japanese Patent Office in 2000 discloses a warm-up device for increasing warm-up efficiency when a vehicle fuel cell power plant is started. In this prior art technology, the target power plant has two fuel cell stacks. According to this technique, heated water is first circulated only to one of the fuel cell stacks when the power plant is started. After warm-up of this fuel cell stack is completed, heated water is circulated to the other fuel cell stack.

The driving force required by the vehicle changes with the running conditions or loading conditions. In a fuel cell power plant for vehicles provided with two or more fuel cell stacks, it is preferred from energy efficiency considerations to operate only some fuel cell stacks when the drive force required by the vehicle is small, and to operate all fuel cell stacks when the driving force required by the vehicle increases.

SUMMARY OF THE INVENTION

Although the prior art technology is desirable from the viewpoint of performing warm-up of the whole power plant efficiently, all the fuel stacks are warmed up in turn, so a given fuel cell stack which does not need to be operated for the time being may also be warmed up, and this may consume excessive energy. Moreover, the energy which a fuel cell stack produces will be consumed for warm-up of other fuel cell stacks, and the energy for running may be insufficient.

It is therefore an object of this invention to estimate a required output power of a fuel cell power plant for vehicles, and to realize operation of the fuel cell power plant according to the required output power.

In order to achieve the above object, this invention provides a warm-up controller for a plurality of fuel cell stacks provided in a fuel cell power plant mounted on a vehicle. The fuel cell stacks are independently operable and generate power for driving the vehicle.

The controller comprises a warm-up circuit which can independently warm up the fuel cell stacks, a sensor which detects a vehicle running condition, and a programmable controller programmed to estimate a required output power required of the power plant within a predetermined time after the vehicle starts running based on the running condition, determine the number of fuel cell stacks to be warmed-up according to the required output power, and control the warm-up circuit to warm-up only the determined number of fuel cell stacks.

This invention also provides a method for controlling warm-up of a plurality of fuel cell stacks provided in a fuel cell power plant mounted on a vehicle, wherein power plant comprises a warm-up circuit which can independently warm up the fuel cell stacks, and the fuel cell stacks are independently operable and generate power for driving the vehicle.

The method comprises detecting a vehicle running condition, estimating a required output power required of the power plant within a predetermined time after the vehicle starts running based on the running condition, determining the number of fuel cell stacks to be warmed-up according to the required output power, and controlling the warm-up circuit to warm-up only the determined number of fuel cell stacks.

The details as well as other features and advantages of this invention are set forth in the remainder of the specification and are shown in the accompanying drawings.

DESCRIPTION OF THE PREFERRED EMBODIMENTS

Figure 1:
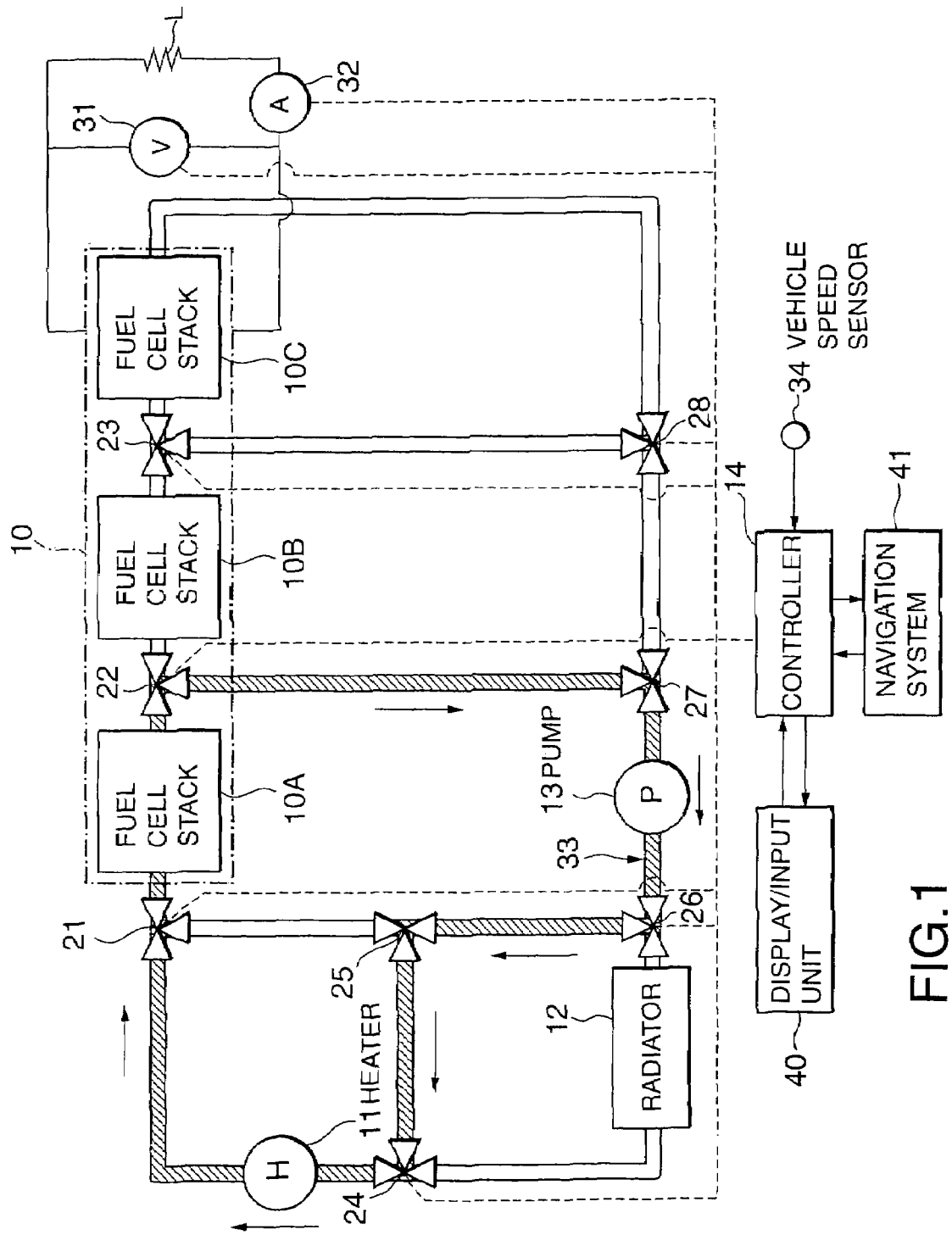
FIG. 1 is a schematic diagram describing the water recirculation state of a fuel cell power plant for vehicles to which this invention is applied.

Referring to FIGS. 1–4 of the drawings, a fuel cell power plant for vehicles to which this invention is applied, is provided with a power generation unit 10 comprising three fuel cell stacks 10A–10C. The fuel cell stacks 10A–10C are connected in parallel to a load L.

The fuel cell power plant for vehicles is provided with a circulation passage 33 which allows cooling water or warm water to circulate through the fuel cell stacks 10A–10C in order to maintain the temperature of the fuel cell stacks 10A–10C within a range required for power generation, as shown in the figure. A pump 13, a heater 11 which heats the recirculated water and a radiator 12 in which the temperature of the recirculated water is reduced, are provided in the circulation passage 33.

Three-way valves 21–28 are also provided for switching flow paths.

The change-over operation of the three-way valves 21–28, operation of the pump 13 and energization of the heater 11 are controlled by a controller 14 according to the state of the power plant. The voltage supplied to the load L from the power generation unit 10 is detected by a voltmeter 31, the current amount is detected by an ammeter 32, and detected data are input to the controller 14 as signals, respectively. Here, the load L is an electric motor which drives the vehicle. The vehicle speed V is also input to the controller 14 as a signal from a vehicle speed sensor 34 which detects the running speed of the vehicle.

The controller 14 comprises a microcomputer provided with a central processing unit (CPU), read-only memory (ROM), random access memory (RAM), and input/output interface. The controller may also comprise plural microcomputers. A display/input unit 40 which informs a driver of the vehicle about the running state of the vehicle and into which the driver can input commands, is connected to the controller 14.

Figure 2:
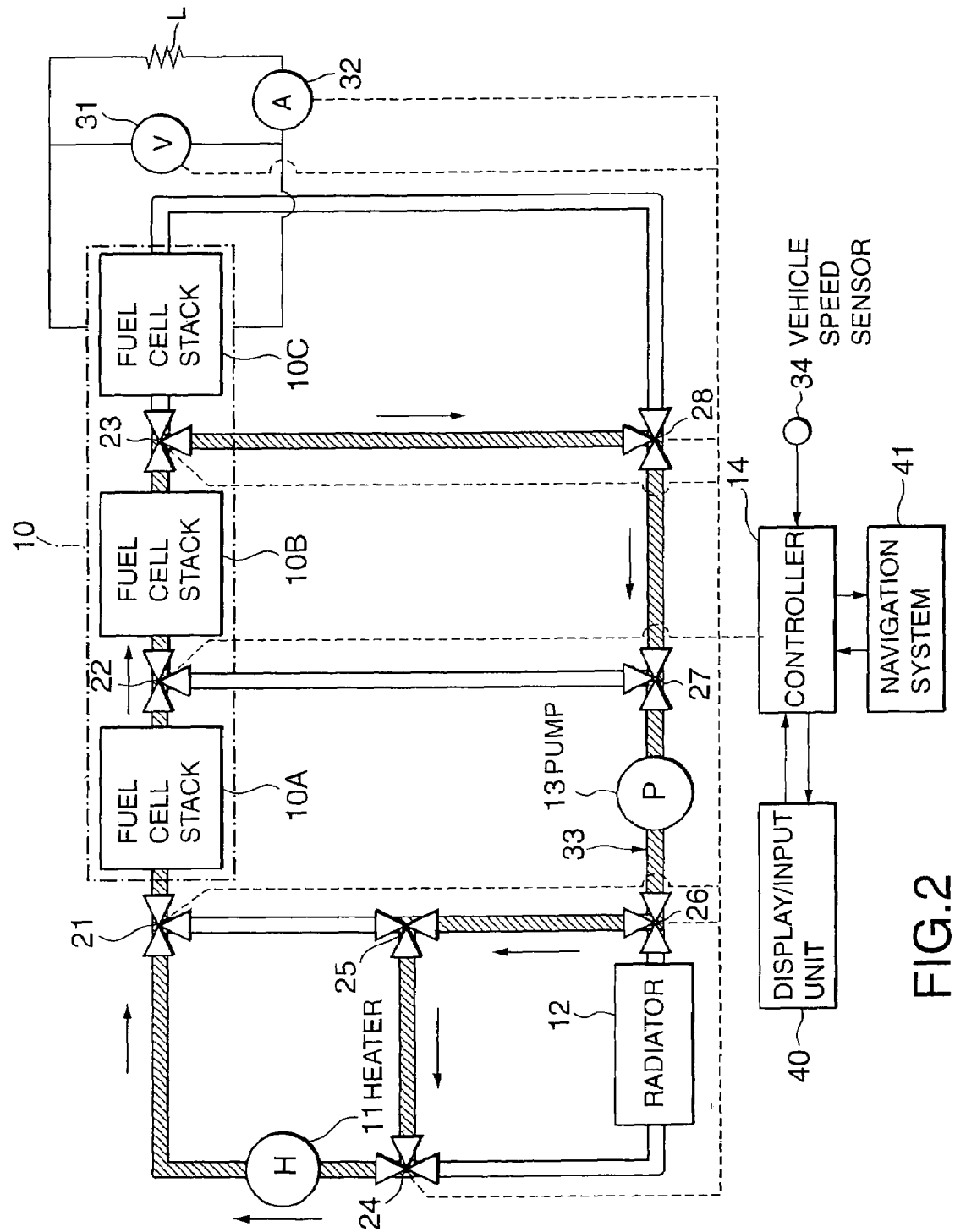
FIG. 2 is similar to FIG. 1, but showing a different water recirculation state.
Figure 3:
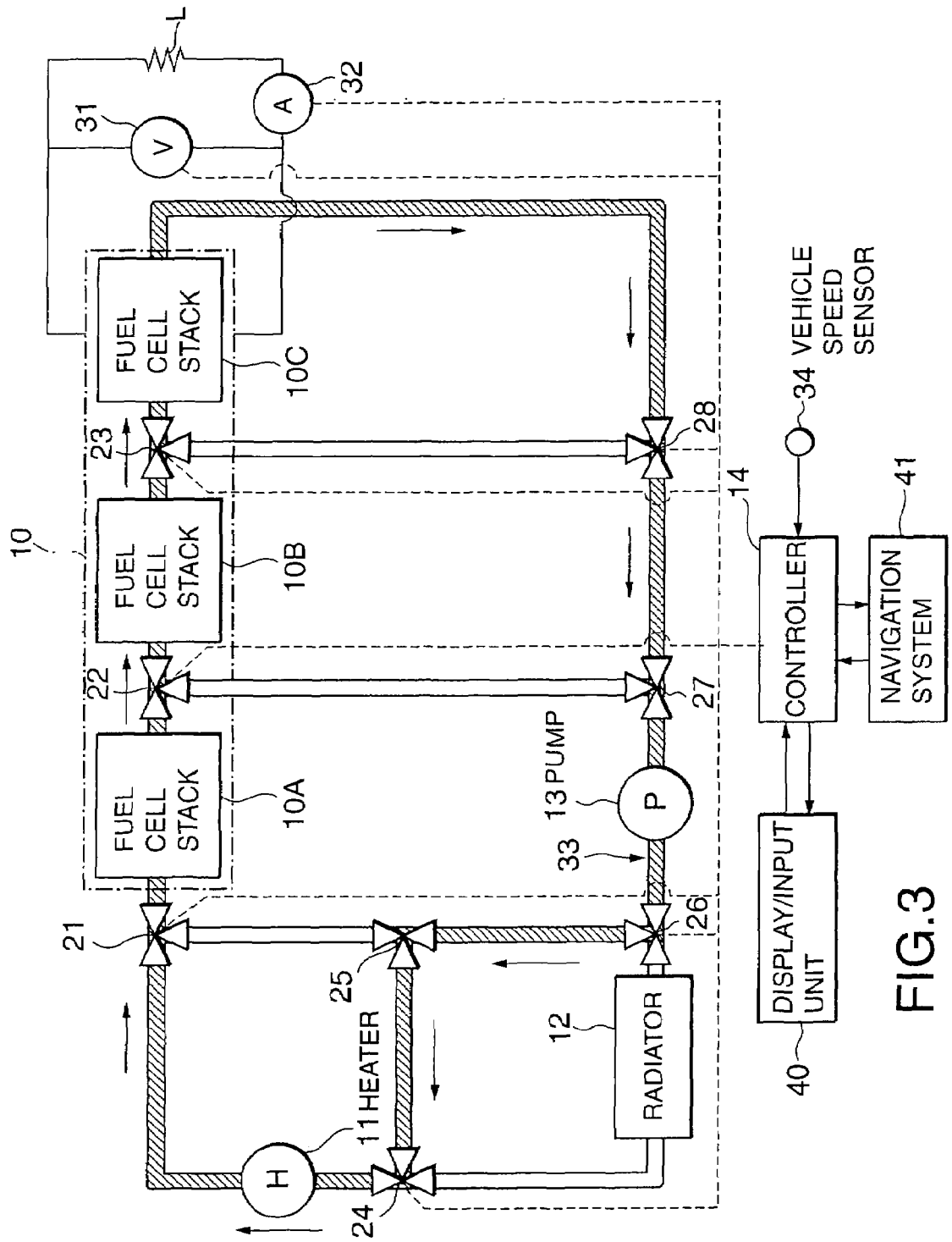
FIG. 3 is similar to FIG. 1, but showing another, different water recirculation state.

To raise the temperature of the fuel cell stack 10A (10B, 10C) to within a range suitable for power generation when the power plant starts, the controller 14 circulates warm water through the circulation passage 33 prior to start of power generation by applying one of the patterns shown in FIGS. 1–3.

Referring firstly to FIG. 1, when only the fuel cell stack 10A is warmed up, the controller 14 operates the three-way valves 21, 22 and 24–27 so that water flows along the path shown by the arrows in the figure, energizes the heater 11 and operates the pump 13. The warm water heated by the heater 11 flows through the circulation passage 33 along the path shown by the arrows in the figure while warming the fuel cell stack 10A. To prevent the temperature of the warm water from falling, the three-way valves 24, 26 are operated so that the warm water bypasses the radiator 12.

Next, referring to FIG. 2, when the fuel cell stacks 10A, 10B are warmed up, the controller 14 operates the three-way valves 21–28 so that water flows along the path shown by the arrows in the figure, energizes the heater 11 and operates the pump 13. The warm water heated by the heater 11 flows through the circulation passage 33 along the path shown by the arrows in the figure, and warms the fuel cell stacks 10A, 10B. Also in this case, to prevent the temperature of the warm water from falling, the three-way valves 24, 26 are operated so that the warm water bypasses the radiator 12.

Next, referring to FIG. 3, when all three of the fuel cell stacks 10A–10C are warmed up, the controller 14 operates the three-way valves 21–28 so that water flows along the path shown by the arrows in the figure, energizes the heater 11 and operates the pump 13. The warm water heated by the heater 11 flows through the circulation passage 33 along the path shown by the arrows in the figure, and warms the fuel cell stacks 10A–10C. Also in this case, to prevent the temperature of the warm water from falling, the three-way valves 24, 26 are operated so that the warm water bypasses the radiator 12.

After warm-up of only the fuel cell stack 10A along the path shown in FIG. 1, or after warm-up of only the fuel cell stacks 10A, 10B along the path shown in FIG. 2 is completed, heat will be generated accompanying power generation performed by these fuel cell stacks.

Figure 4:
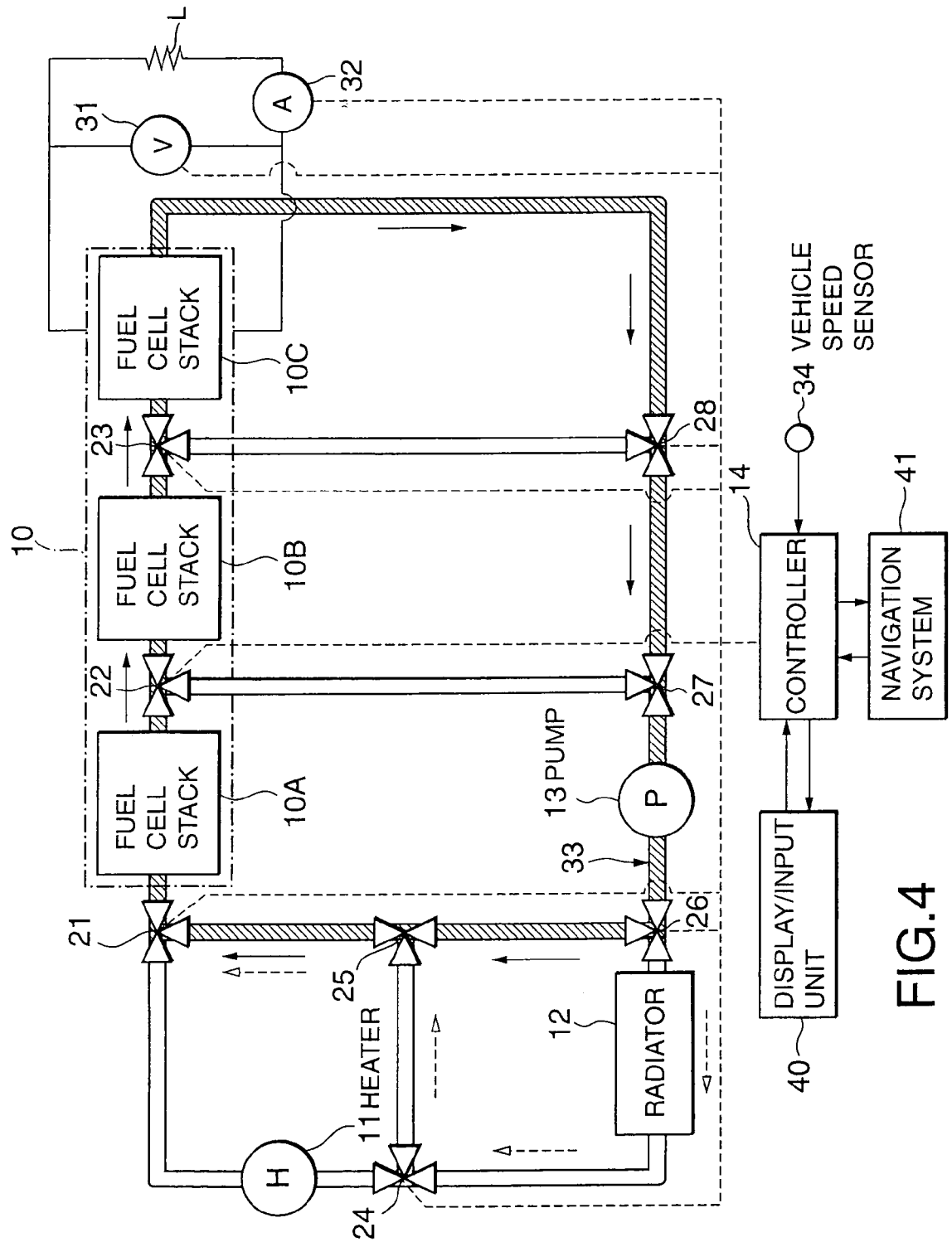
FIG. 4 is similar to FIG. 1, but showing yet another, different water recirculation state.

The controller 14 makes water flow through all of fuel cell stacks 10A–10C according to the pattern shown by the solid line arrows in FIG. 4 using this surplus heat so as to warm up the fuel cell stack 10C or the fuel cell stacks 10B, 10C which were not previously warmed up. That is, the controller 14 stops energizing the heater 11 and operates the three-way valves 21, 25 so as to cause the water discharged from the pump 13 to flow into the fuel cell stack 10A without passing through the heater 11.

Consequently, the recirculated water absorbs heat from the fuel cell stack 10A or the fuel cell stacks 10A, 10B which started power generation, raises the temperature, and warms the fuel cell stack 10C or the fuel cell stacks 10B, 10C which were not warmed up.

Further, after warm-up of all the fuel cell stacks 10A–10C is completed, the controller 14 operates the three-way valves 24–26, and makes the water discharged from the pump 13 to flow into the fuel cell stack 10A from the three-way valve 26 via the radiator 12, three-way valve 24, three-way valve 25 and three-way valve 21 as shown by the dashed line arrows in the figure. In this water recirculation pattern, the water recirculated in the recirculation passage 33 absorbs heat from the fuel cell stacks 10A–10C under power generation, and the heat is radiated by the radiator 12.

Even when warm-up of all the fuel stacks 10A–10C is not completed, if the temperature of the recirculated water rises considerably, the recirculated water is likewise cooled by the radiator 12. In this case, the water recirculation pattern shown by the dashed line arrows is applied instead of the water recirculation pattern shown by the solid line arrows in the figure.

Figure 5:
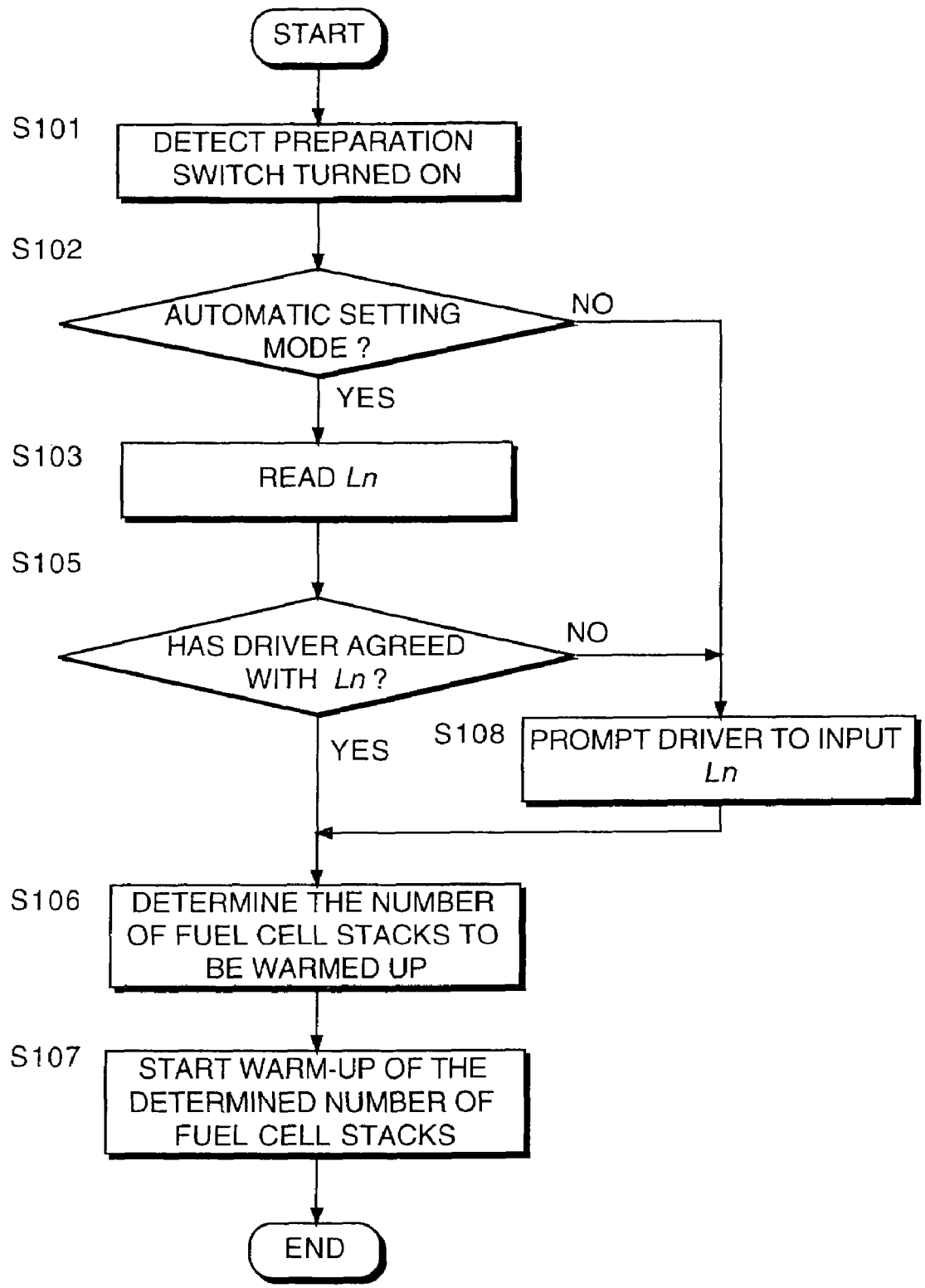
FIG. 5 is a flow chart describing a power plant warm-up routine executed by a controller according to this invention.

Now, when the power plant is started, the controller 14 selects the water circulation patterns of FIGS. 1–3 by executing a power plant warm-up routine shown in FIG. 5 before the power plant starts generating power, and warms up the vehicle fuel cell stack required to drive the vehicle under the given conditions.

This routine is executed once prior to starting power generation when the power plant starts.

Referring to FIG. 5, firstly in a step S101, the controller 14 detects that the driver of the vehicle has turned a power plant start preparation switch ON. The start preparation switch is provided on the above-mentioned display/input unit 40.

In a following step S102, a setting mode of the output power required of the power plant is determined. The output power setting mode determines whether the output power required of the power plant is to be specified by the driver, or set automatically based on the past running pattern. This selection is performed by the driver by operating the power plant start preparation switch. In the step S102, based on the signal from the power plant start preparation switch, the controller 14 determines whether the manual setting mode or automatic setting mode is selected.

When the automatic setting mode is selected as a result of the determination of the step S102, the controller 14 reads the required output power Ln prestored in the memory in a step S103. The required output power Ln is the estimated value of the maximum output power required of the power plant within a predetermined time from starting of the power plant. Here, the predetermined time is set to ten minutes. The required output power Ln is updated by execution of a routine shown in FIG. 7, described below.

In a following step S105, the estimated required output power Ln is displayed on the display/input unit 40, and the agreement of the driver is requested. The driver inputs whether or not he/she agrees to the displayed required output power on the display/input unit 40.

When the manual setting mode is chosen as a result of the determination of the step S102, or when the driver does not agree to the required output power Ln in the step S105, the driver is asked for manual input of the required output power in a step S108, and the controller 14 reads the required output power input to the display/input unit 40.

Figure 6:
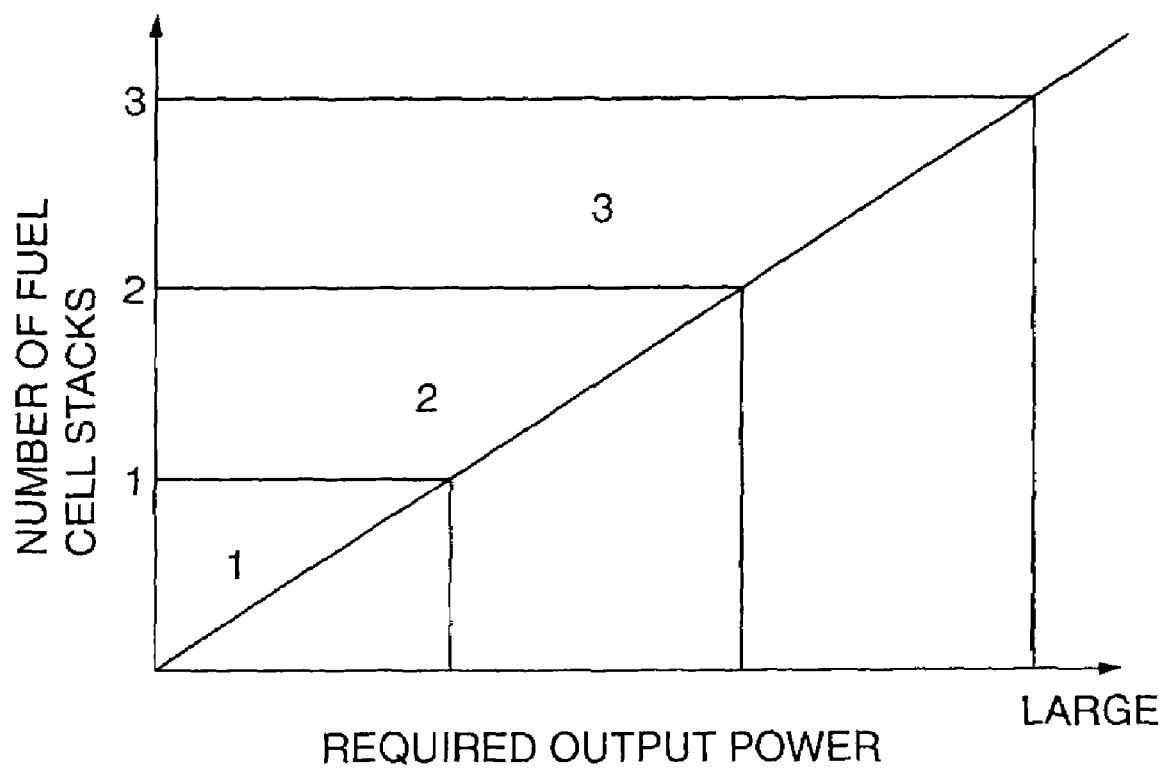
FIG. 6 is a diagram describing the characteristics of a map specifying a required output power and the number of fuel cell stacks which should be operated, stored by the controller.

When the driver agrees to the required output power Ln in the step S105, or after reading the required output power input to the display/input unit 40 in the step S108, the controller 14 performs the processing of a step S106. In the step S106, the number of fuel cell stacks which should start is determined by referring to a map having the characteristics shown in FIG. 6 which is prestored in the memory of the controller 14. According to this map, the number of fuel cell stacks which should start increases according to the required output power.

In a following step S107, one of the above patterns of FIGS. 1–3 is selected and warm-up of the fuel cell stack(s)

is performed according to the number of fuel cell stacks that will be operated for satisfying the required output power.

Next, a routine for generating a map of the required output power Ln used in the step S103 of FIG. 5 will be described referring to FIG. 7. This routine is executed only once immediately after the vehicle has started running independently of the power plant warm-up routine of FIG. 5. The required output power Ln updated by this routine is stored in the memory of the controller 14, and is used in the step S103 of FIG. 5 on the next occasion when the power plant is operated. The initial value of the required output power Ln is set to the average value of the required output power of a fuel cell power plant for a vehicle of identical specification.

In a step S121, the controller 14 resets a timer value T to zero.

In a following step S122, it is determined whether or not the vehicle speed V is larger than zero, i.e., whether or not the vehicle is running. When the vehicle speed V is not larger than zero, the processing of the steps S121, S122 is repeated without proceeding to further steps until the vehicle speed V becomes larger than zero.

When the vehicle speed V becomes larger than zero, the output power of the power plant is calculated from the product of the output voltage of the power generation unit 10 input from the voltmeter 31 and the output current of the power generation unit 10 from the ammeter 32 in a step S123. The maximum of the output power after starting the routine is stored in the memory of the controller 14 as the maximum output power Lmax. The output power calculated by this execution of the routine and the maximum output power Lmax stored in the memory are compared, and when the output power calculated on this occasion is larger than the maximum output power Lmax, the maximum output power Lmax is updated by the value of the load calculated on this occasion.

In a following step S124, the timer value T is compared with a predetermined time. The predetermined time is ten minutes as mentioned above. Here, the units of the timer value T are in seconds, and the predetermined time is 600 seconds.

When the timer value T does not reach the predetermined time, the controller 14 stands by for one second in a step S125, increments the timer value T in a step S126, and repeats the processing of the steps S123, S124.

When the timer value T exceeds the predetermined time of 600 seconds in the step S124, the controller 14 performs weighted average processing of the required output power by the following equation (1) in a step S127.

$$Ln = r L_{n-1} + (1-r) Lmax \tag{1}$$

where, r=weighting coefficient.

That is, the required output power $L_{n-1}$ calculated on the immediately preceding occasion the routine was executed and the maximum load Lmax calculated on this execution of the routine are averaged by applying a weighting coefficient r, and the result is set as a new required output power Ln. The weighting coefficient r is a constant larger than zero, and smaller than unity.

After the processing of the step S127, the controller 14 terminates the routine.

According to the power plant warm-up routine of FIG. 5 which the controller 14 performs when the power plant starts, as warm-up of the fuel cell stacks is performed by applying one of the warm-up patterns of FIGS. 1–3 based on the past track record of the required output power during ten minutes after the vehicle start, only the number of fuel cell stacks according to the required output power is warmed up first when the power plant is started. When warm-up is completed, the power plant starts power generation using the fuel cell stack which completed warm-up, and the vehicle starts running using the output power of the power plant. As for the fuel cell stacks which were not warmed up during starting, after the vehicle starts running, warm-up is performed according to a water recirculation pattern represented by the solid arrows in FIG. 4 which uses the surplus heat of the fuel cell stacks in operation. Thus, finally, all the fuel cell stacks 10A–10C will be in a state where they are able to generate power. Thus, the energy consumed by warm-up can be suppressed to the minimum by warming up only the fuel cell stacks required to satisfy the required output power within the predetermined time, i.e., ten minutes, after the vehicle starts running, when the power plant starts.

Next, referring to FIG. 8, a second embodiment of this invention will be described.

In this embodiment, the vehicle is provided with a car navigation system 41 shown in FIGS. 1–4 which collects information on the road situation from the present location to the destination of the vehicle. The controller 14 determines the required output power of the power plant based on the information from the car navigation system 41.

Figure 7:
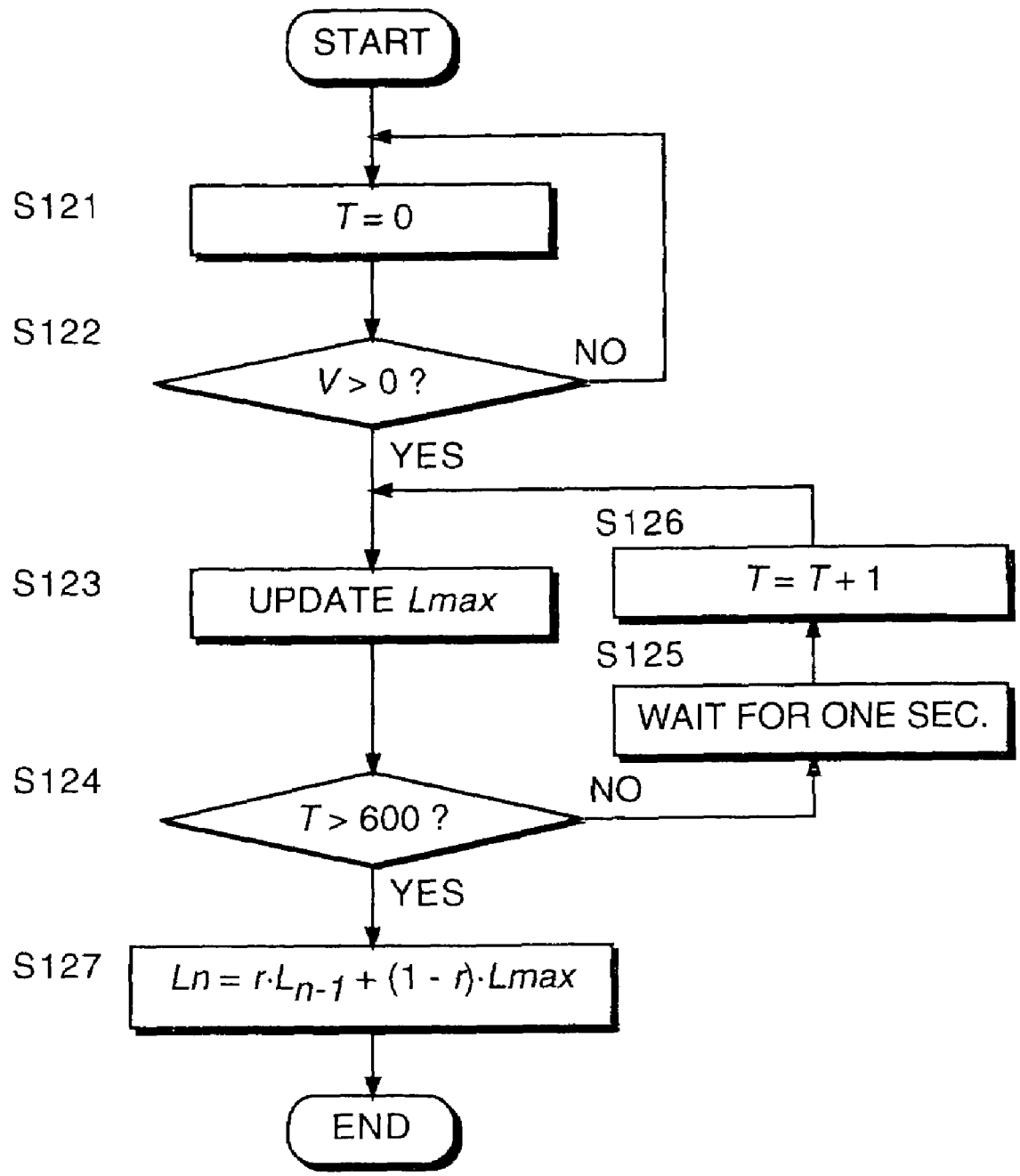
FIG. 7 is a flowchart describing a routine for calculating the required output power executed by the controller.
Figure 8:
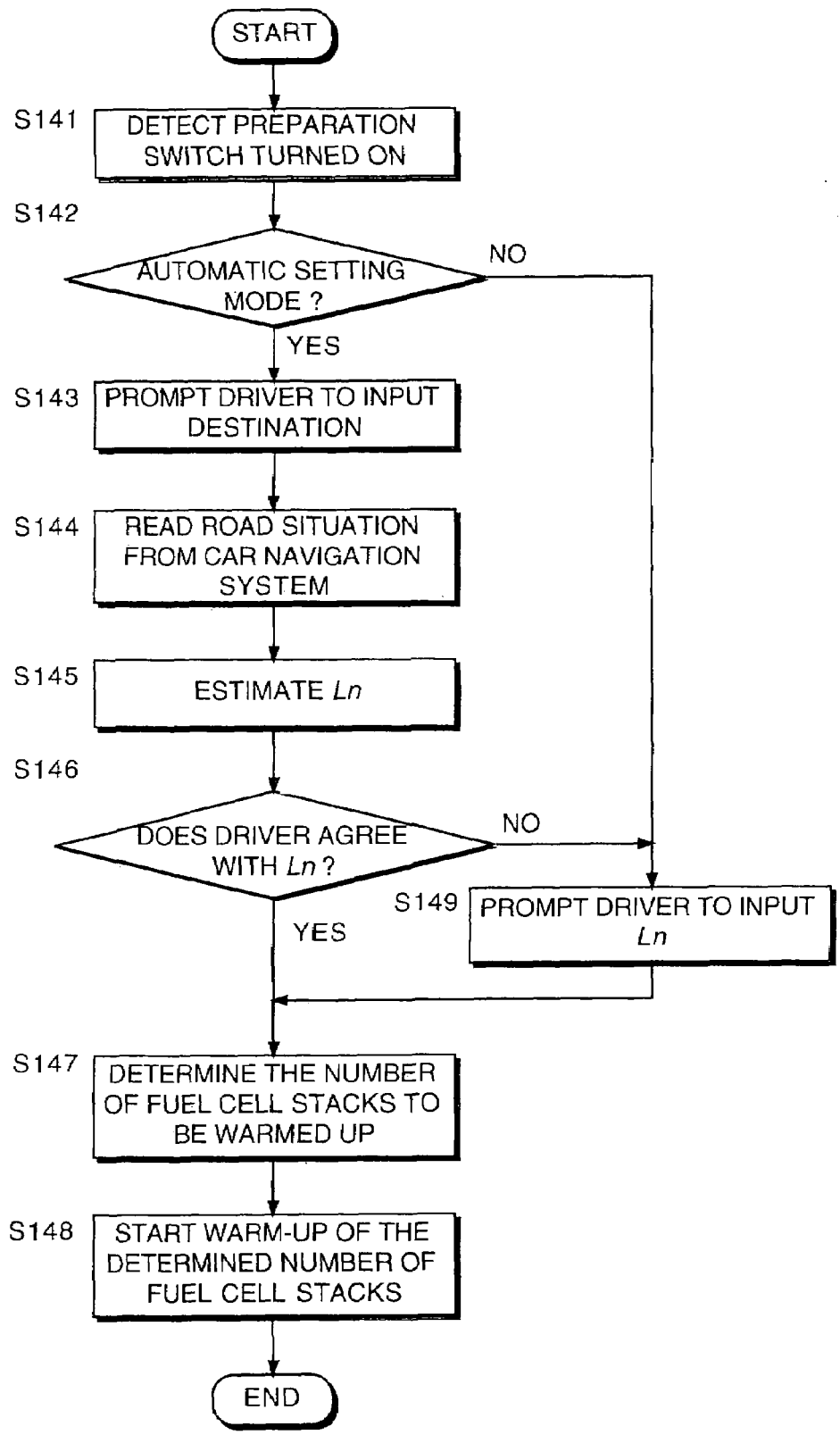
FIG. 8 is similar to FIG. 5, but showing a second embodiment of this invention.

For this purpose, the controller 14 performs a power plant warm-up routine shown in FIG. 8 which replaces the routines of FIG. 5 and FIG. 7 of the first embodiment.

The processing of a step S141 is identical to that of the step 101 of the routine of FIG. 5, the processing of a step S142 is identical to that of the step S102 of the routine of FIG. 5, and the processing of steps S146–S149 is identical to that of the steps S105–S108 of the routine of FIG. 5, respectively.

When the automatic setting mode is set in the step S142, the controller 14 asks the driver to input the destination to the navigation system 41 in a step S143. The controller 14 does not proceed to the following step S144 until it confirms input of the destination by the driver.

In a following step S144, the controller 14 reads the road situation from the present location of the vehicle to the destination from the car navigation system 41. Here, the car navigation system 41 may be a system which reads road information from a storage medium such as a memory or a disk based on the destination input and the present location, or it may be a system which receives road information from a server of an information center via a communication means with the outside such as a cellular phone. The road situation which the controller 14 reads includes the following information about the roads which the driver intends to take within a predetermined time after the vehicle starts running, such as the type of road, i.e., highways or ordinary roads, whether the roads are flat, uphill or downhill, and whether these roads are congested. Here, the predetermined time is ten minutes.

In a following step S145, the controller 14 estimates the required output power Ln of the power plant required for the running of the vehicle within the predetermined time after the vehicle starts running based on the read road situation. Specifically, a running speed is set from the type of the road selected for running taking account of whether or not it is congested. Once the running speed is set, the required power plant output power Ln is then calculated from the running speed and the slope of the road to be taken.

If a map of required output power according to road slope and running speed is prepared beforehand experimentally or by simulation and stored in the memory of the controller 14, the required output power Ln can be calculated by searching the map in the step S145. Instead of a map, an approximation which calculates the required output power Ln from the road slope and running speed may be used. The calculated required output power Ln is displayed on the display/input unit 40.

In a following step S146, as in the step S105 of FIG. 5, the agreement of the driver is requested regarding the displayed required output power Ln. When the driver does not agree, or when the driver chooses manual input in the step S142, manual input of the required output power Ln via the display/input unit 40 is requested in a step S149 as in the step S108, and the controller 14 reads the inputted required output power Ln. Instead of inputting the required output power Ln, the driver may input road conditions into the display/input unit 40, and the controller 14 may determine the required output power Ln from road conditions by the same method as that of the step S145.

In the step S146, the driver may not agree to the required output power Ln for example when he/she selects a road other than that set by the car navigation system 41, or when he/she knows of circumstances of the road to be taken other than the road slope and running speed used for calculation of the required output power Ln, such as information on road works.

When the required output power Ln is determined in the step S146 or step S149, in steps S147, S148, the controller 14 performs identical processing to that of the steps S106, S107 of FIG. 5, select one of the above patterns of FIGS. 1–3 based on the required output power Ln, and perform warm-up of the fuel cell stack(s) 10A (10B, 10C) that will be operated for satisfying the required output power Ln.

Next, referring to FIG. 9, a third embodiment of this invention will be described.

In this embodiment, as in the second embodiment, the controller 14 estimates the required output power Ln in combination with the car navigation system 41. For this purpose, a routine shown in FIG. 9 is performed instead of the routine of FIG. 8.

Figure 9:
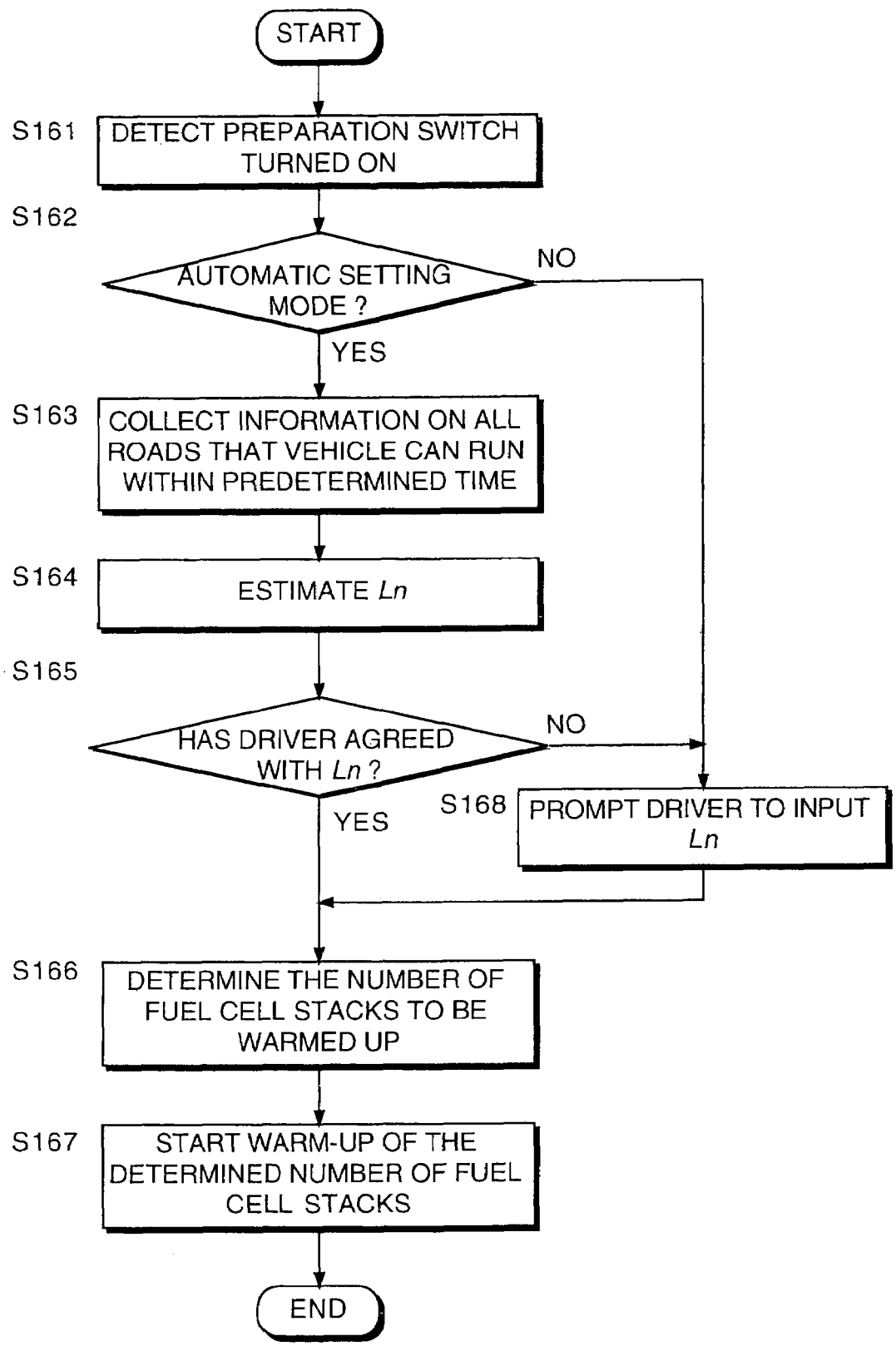
FIG. 9 is similar to FIG. 5, but showing a third embodiment of this invention.

The processing of steps S161, S162 of the routine of FIG. 9 is identical to that of the steps S141, S142 of the routine of FIG. 8. Also, the processing of steps S165–168 is identical to that of the steps S146–S149 of the routine of FIG. 8.

When the automatic setting mode is chosen in the step S162, the controller 14 collects information on all the roads that the vehicle can take within the predetermined time from the present location of the vehicle from the car navigation system in a step S163. The kind of information collected is identical to that in the second embodiment.

In a following step S164, the controller 14 estimates the required output power for all the roads for which information was collected. The method of estimating the required output power is identical to that of the second embodiment. The maximum value Ln of the required output power is displayed on the display/input unit 40.

In a following step S165, as in the step S126 of FIG. 8, the controller 14 requests the agreement of the driver regarding the displayed required output power Ln. Here, the driver may not agree to the required output power Ln for example when the driver knows the situation of the road that he/she intends to take beforehand, and the required output power deemed necessary is different from the displayed value.

When a driver does not agree to the required output power Ln displayed in the step S165, or when the automatic mode is not chosen in the step S162, in a step S168, as in the step S149 of FIG. 8, manual input of the required output power Ln to the display/input unit 40 is requested, and the controller 14 reads the inputted required output power Ln.

After determining the required output power Ln in the step S165 or step S168, in steps S166, S167, the controller 14 performs identical processing to that of the steps S106, S107 of FIG. 5, selects one of the patterns of FIGS. 1–3 based on the required output power Ln, and performs warm-up of the fuel cell stack(s) 10A (10B, 10C) that will be operated for satisfying the required output power Ln.

In this embodiment, although the controller 14 collects information on all the roads that can be taken within the predetermined time, information may be more simply collected about the situation of all the roads within a predetermined distance from the present vehicle location. The predetermined distance may be set to, for example, five kilometers.

In all the above embodiments, the number of fuel cell stacks which are warmed up is determined according to the road situation so that the output power required Ln for running the vehicle within the predetermined time from when the vehicle starts running can be obtained, and the energy required for warm-up can be suppressed to the minimum without causing a shortage of output power.

Execution of each of the routines of FIGS. 5, 8, 9 starts when the power plant start preparation switch is turned ON. After warm-up of the fuel cell stack(s) 10A (10B, 10C) is completed by execution of the routines, processing may be continued by one of the following methods.

In one method, warm-up completion of the fuel cell stacks may be displayed on the display/input unit 40, and power generation by the power plant started by turning a main switch ON. The main switch may be provided in the display/input unit 40, or provided independently of the display/input unit 40.

Another method is that the power plant starts power generation automatically when warm-up of the fuel cell stack(s) 10A (10B, 10C) according to the required output power Ln is completed.

In all the above embodiments, the predetermined time is set to ten minutes. This is based on the time taken to complete warm-up of other fuel cell stacks by the surplus heat of the fuel cell stack(s) first operated after the vehicle starts running, i.e., on the time required until warm-up of all the fuel cell stacks 10A–10C is completed under the recirculation pattern shown by the solid line arrows in FIG. 4 from when the vehicle starts running. Therefore, it is preferred to determine the predetermined time by experiment or simulation.

The contents of Tokugan 2001-385713, with a filing date of Dec. 19, 2001 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

For example, in the above embodiments, this invention is applied to a power plant comprising the three fuel cell stacks 10A–10C, but it may be applied to all power plants provided with two or more fuel cell stacks which can be individually warmed up.

INDUSTRIAL FIELD OF APPLICATION

As mentioned above, this invention estimates the output power required of a power plant within a predetermined time from when the vehicle starts running, and warms up only the number of fuel cell stacks according to the required output power prior to start of running. Therefore, the energy consumed by warm-up can be reduced in a fuel cell power plant for vehicles wherein energy cannot be supplied from outside.

The embodiments of this invention in which an exclusive property or privilege is claimed are defined as follows:

The invention claimed is:

1. A warm-up controller for a plurality of fuel cell stacks provided in a fuel cell power plant mounted on a vehicle, the fuel cell stacks being independently operable and generating power for driving the vehicle, the controller comprising:
   a warm-up circuit which can independently warm up the fuel cell stacks;
   a sensor which detects a vehicle running condition; and
   a programmable controller programmed to:
   estimate a required output power required of the power plant within a predetermined time after the vehicle starts running based on the running condition;
   determine the number of fuel cell stacks to be warmed-up according to the required output power; and
   control the warm-up circuit to warm-up only the determined number of fuel cell stacks.

2. The warm-up controller as defined in claim 1, wherein the controller is further programmed to control the warm-up circuit to warm-up only the determined number of fuel cell stacks before the vehicle starts running.

3. The warm-up controller as defined in claim 1, wherein the sensor detects the output power of the power plant, and the controller is further programmed to monitor the output power of the power plant for the predetermined time after the vehicle starts running, and estimate the required output power which is to be applied to determine the number of fuel cell stacks for warm-up on a next occasion based on a maximum value of the output power monitored in the predetermined time.

4. The warm-up controller as defined in claim 1, wherein the sensor comprises a navigation system which detects a condition of a road leading from a current location of the vehicle to a destination of the vehicle, and the controller is further programmed to estimate the required output power based on the condition of the road leading from the current location to the destination.

5. The warm-up controller as defined in claim 4, wherein the road condition comprises a slope of a road and a speed with which a vehicle can travel on the road.

6. The warm-up controller as defined in claim 1, wherein the sensor comprises a navigation system which detects a condition of all roads leading from a current location of the vehicle to a destination of the vehicle, and the controller is further programmed to estimate the required output power based on the road condition of all the roads leading from the current location to the destination.

7. The warm-up controller as defined in claim 6, wherein the road condition comprises a slope of a road and a speed with which a vehicle can travel on the road.

8. The warm-up controller as defined in claim 1, wherein the sensor comprises a running condition input device, and the controller is further programmed to estimate the output power required of the power plant within the predetermined time from when the vehicle starts running based on a running condition input by a driver of the vehicle to the input device.

9. A warm-up controller for a plurality of fuel cell stacks provided in a fuel cell power plant mounted on a vehicle, the fuel cell stacks being independently operable and generating power for driving the vehicle, the controller comprising:
   a warm-up circuit which can independently warm up the fuel cell stacks;
   means for detecting a vehicle running condition;
   means for estimating a required output power required of the power plant within a predetermined time after the vehicle starts running based on the running condition;
   means for determining the number of fuel cell stacks to be warmed-up according to the required output power; and
   means for controlling the warm-up circuit to warm-up only the determined number of fuel cell stacks.

10. A method for controlling warm-up of a plurality of fuel cell stacks provided in a fuel cell power plant mounted on a vehicle, the power plant comprising a warm-up circuit which can independently warm up the fuel cell stacks, and the fuel cell stacks being independently operable and generating power for driving the vehicle, the method comprising:
    detecting a vehicle running condition;
    estimating a required output power required of the power plant within a predetermined time after the vehicle starts running based on the running condition;
    determining the number of fuel cell stacks to be warmed-up according to the required output power; and
    controlling the warm-up circuit to warm-up only the determined number of fuel cell stacks.

11. The warm-up controller as defined in claim 3, wherein the controller is further programmed to calculate the required output power which is to be applied to determine the number of fuel cell stacks for warm-up on a next occasion based on the required output power which has been applied to determine the number of fuel cell stacks for warm-up on a present occasion and the maximum value of the output power monitored in the predetermined time on the present occasion.

12. The warm-up controller as defined in claim 11, wherein the controller is further programmed to calculate the required output power which is to be applied to determine the number of fuel cell stacks for warm-up on the next occasion by performing weighted average processing of the required output power which has been applied to determine the number of fuel cell stacks for warm-up on a present occasion and the maximum value of the output power monitored in the predetermined time on the present occasion.

* * * * *